C. D. BRUNDAGE.
RESILIENT WHEEL.
APPLICATION FILED APR. 8, 1915.
1,158,977.
Patented Nov. 2, 1915.
2 SHEETS—SHEET 1.
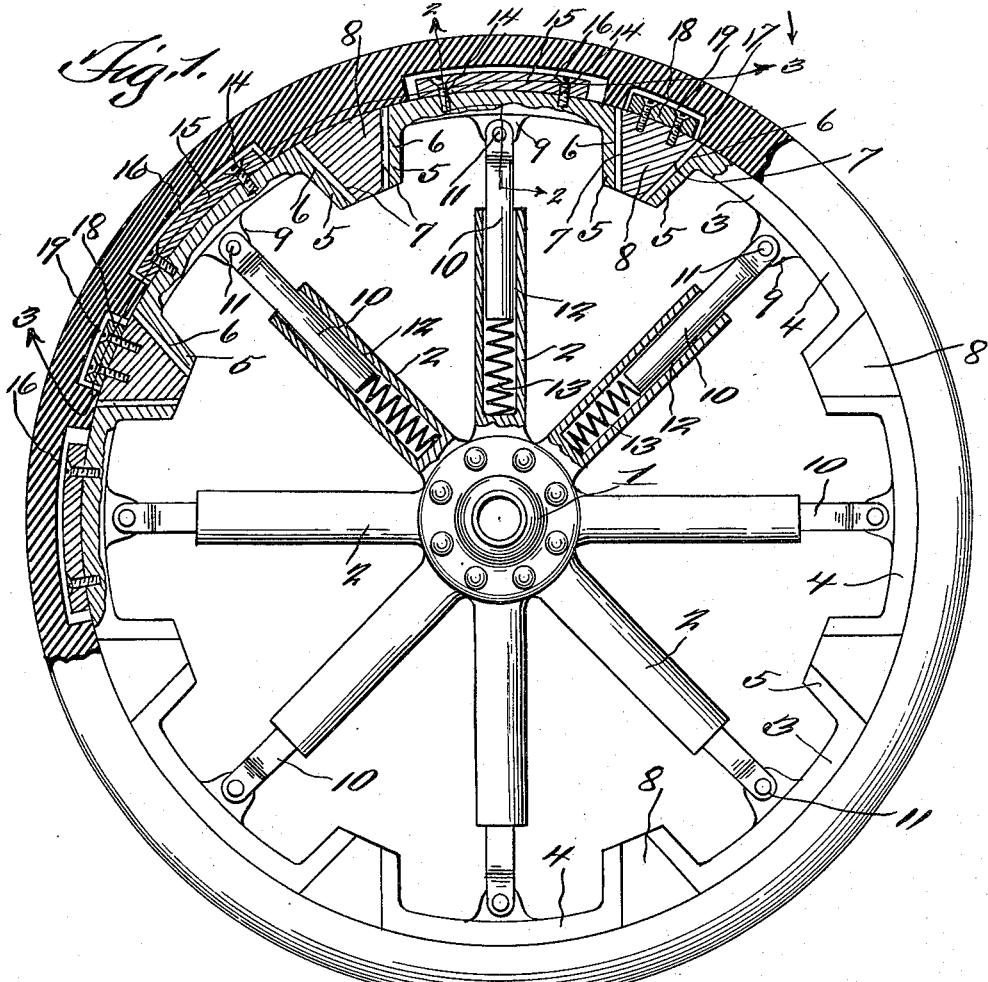
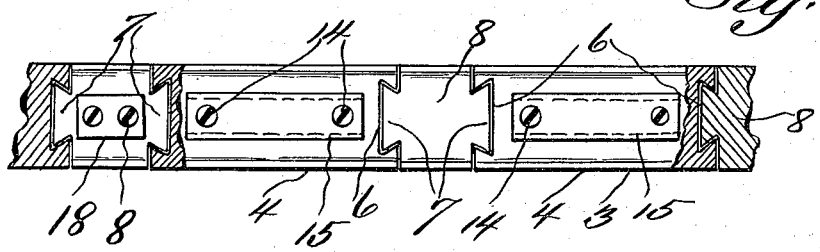
Witnesses
Inventor
C. D. Brundage,
By D. Swift & Co.
his Attorneys

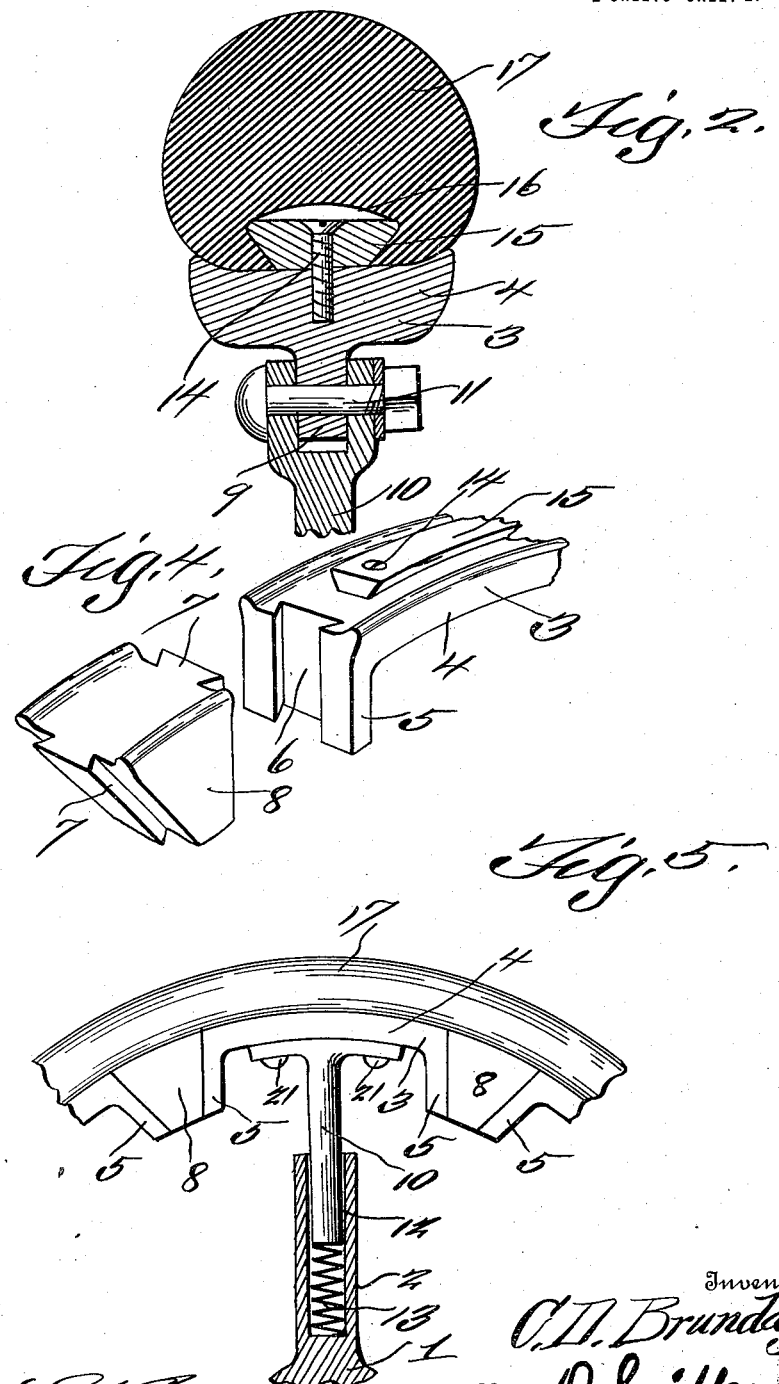

UNITED STATES PATENT OFFICE.

CHARLES D. BRUNDAGE, OF OTTAWA, ILLINOIS.

RESILIENT WHEEL.

1,158,977.  Specification of Letters Patent.  Patented Nov. 2, 1915.

Application filed April 8, 1915. Serial No. 19,982.

*To all whom it may concern:*

Be it known that I, CHARLES D. BRUNDAGE, a citizen of the United States, residing at Ottawa, in the county of La Salle and State of Illinois, have invented a new and useful Resilient Wheel; and I do hereby declare the following to be a full, clear, and exact description of the invention, such as will enable others skilled in the art to which it appertains to make and use the same.

This invention relates to an improved resilient wheel designed for use upon automobiles and other vehicles.

An aim of the invention is to provide an improved wheel of this nature comprising simple, efficient, and practical features of construction.

One of the features of construction is the provision of a sectional rim, the sections of which are connected in sequence by virtue of sliding joints, and each section is provided with pivotal connections to resilient means, which are interposed between the sections and the hub of a wheel, there being enough pivotal movements of the sections and sufficient play in the yielding means, to permit the sections to yield toward and from the hub incident to pressure on the hub.

Another feature of the invention is to provide the sections of the rim with V-shaped strips, which are engaged by the tire, for holding the tire on the rim.

In practical fields the details of construction may necessitate alterations, falling within the scope of what is claimed.

The invention comprises further features and combinations of parts, as hereinafter set forth, shown in the drawings and claimed.

In the drawings:—Figure 1 is a view in side elevation and partly in section of the improved resilient wheel constructed in accordance with the invention. Fig. 2 is a sectional view on line 2—2 of Fig. 1. Fig. 3 is a sectional view on line 3—3 of Fig. 1. Fig. 4 is an enlarged detail view showing the connection between the sections of the rim. Fig. 5 is a view in side elevation of a wheel showing a modified structure.

Referring more particularly to the drawings, 1 designates the hub member of the wheel, which is provided with a plurality of radially extending tubular members 2, which may be either formed integrally with the hub member or separate therefrom. The rim 3 of the wheel comprises a plurality of sections 4 having angular ends 5, and the adjacent faces of these ends are provided with dove-tailed grooves 6, which receive the dove-tailed ribs 7 of the rim connecting members or blocks 8, whereby the sections of the rim may have independent movements relative to each other.

Projecting centrally from each of the sections of the rim is an ear or lug 9, to which a plunger spoke 10 is pivoted as at 11. The plunger spokes 10 telescope into the tubular members 2, and have sufficient play as shown at 12 to permit of yieldable actions of the hub member, incident to pressure thereon. Interposed between the inner ends of the tubular members 2 and the spoke plungers coil springs 13 are arranged, in order to yieldably withstand pressure on the hub. Secured at 14 to the outer faces or peripheries of the rim sections are strips 15, which are substantially V-shaped in cross section, and which are received by the correspondingly shaped elongated pockets 16 of the inner peripheral surface of the tire 17, for retaining the tire to the rim. The pockets 16 are a little longer than the strips 15, so as to permit of a slight movement of the tire annularly about the rim of the wheel, but not enough to allow continuous creeping. Every other connecting member or block 8 has bolted to it short strips 18, similar to the strips 15, that is, in cross section, and are designed to be received by correspondingly shaped pockets 19 of the tire. In Fig. 5 the pivotal connection 11 is dispensed with, and the plunger spokes are bolted at 21 to the rim section. Before the tire 17 is placed on the rim the strips 15 are secured in place by the screws 14, the short strips 18 are likewise secured. After securing the strips 15 and 18, the tire is simply stretched and slipped over the edges of said strips.

The invention having been set forth, what is claimed as new and useful is:—

1. In a resilient wheel having a hub, a sectional rim, the sections of which are provided with radially sliding joints and are connected in sequence, each section having yieldable connections with the hub, strips substantially V-shaped in cross section secured to the outer peripheral surface of each rim section, and a tire on the rim having pockets corresponding in shape to the strips to receive the strips.

2. In a resilient wheel having a hub member, a sectional rim, each section having substantially right angled ends, the adjacent faces of the right angled ends having dovetailed grooves, connecting members or blocks having dove-tailed ribs to be received by the grooves, so as to not only connect the sections in sequence, but to permit the sections to slide or move radially relative to each other, each of the sections having yieldable connections with the hub, a tire on the rim, and means for securing the tire to the rim.

3. In a resilient wheel having a hub member, a sectional rim, each section having substantially right angled ends, the adjacent faces of the right angled ends having dovetailed grooves, connecting members or blocks having dove-tailed ribs to be received by the grooves, so as to not only connect the sections in sequence, but to permit the sections to slide or move radially relative to each other, yieldable means between each section and the hub, pivotal connections between each section and the yieldable means, a tire on the rim, and means for securing the tire to the rim.

4. In a resilient wheel having a hub member, a sectional rim, each section having substantially right angled ends, the adjacent faces of the right angled ends having dovetailed grooves, connecting members or blocks having dove-tailed ribs to be received by the grooves, so as to not only connect the sections in sequence, but to permit the sections to slide or move radially relative to each other, yieldable means between each section and the hub, pivotal connections between each section and the yieldable means, a tire having a series of pockets substantially V-shaped in cross section, and a series of strips corresponding in shape to the pocket, one secured to the outer peripheral surface of each rim section, to be received in each of the pockets for holding the tire on the rim.

In testimony whereof I have signed my name to this specification in the presence of two subscribing witnesses.

CHARLES D. BRUNDAGE.

Witnesses:
 JOHN H. LIEGLER,
 MARGARET SORENSEN.